US012051061B2

United States Patent
Dichtl

(10) Patent No.: US 12,051,061 B2
(45) Date of Patent: Jul. 30, 2024

(54) METHOD FOR OPERATING A DISTRIBUTED DATABASE SYSTEM, DISTRIBUTED DATABASE SYSTEM, AND INDUSTRIAL AUTOMATION SYSTEM

(71) Applicant: Siemens Aktiengesellschaft, Munich (DE)

(72) Inventor: Markus Dichtl, Neu-Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 450 days.

(21) Appl. No.: 17/414,985

(22) PCT Filed: Nov. 13, 2019

(86) PCT No.: PCT/EP2019/081118
§ 371 (c)(1),
(2) Date: Jun. 17, 2021

(87) PCT Pub. No.: WO2020/126236
PCT Pub. Date: Jun. 25, 2020

(65) Prior Publication Data
US 2022/0067727 A1    Mar. 3, 2022

(30) Foreign Application Priority Data
Dec. 21, 2018 (EP) .................................. 18215152

(51) Int. Cl.
*G06Q 20/00* (2012.01)
*G06Q 20/38* (2012.01)
(Continued)

(52) U.S. Cl.
CPC ..... *G06Q 20/38215* (2013.01); *G06Q 20/401* (2013.01); *H04L 9/3236* (2013.01); *H04L 9/3247* (2013.01); *H04L 9/50* (2022.05)

(58) Field of Classification Search
CPC .......... G06Q 20/38215; G06Q 20/401; G06Q 20/00; H04L 9/3236; H04L 9/3247; H04L 9/50
(Continued)

(56) References Cited

U.S. PATENT DOCUMENTS 11,005,664 B2 * 5/2021 Chalkias ............... H04L 9/3247
11,429,956 B2 * 8/2022 Bartolucci ......... G06Q 20/3823
(Continued)

FOREIGN PATENT DOCUMENTS

| CN | 1601490 A | 3/2005 |
|---|---|---|
| CN | 101241505 A | 8/2008 |

(Continued)

OTHER PUBLICATIONS

Needham Roger M et al: "Using encryption for authentication in large networks of computers", ACM: Communications of the ACM, vol. 21, No. 12, Dec. 1978; 1978.
(Continued)

*Primary Examiner* — Clifford B Madamba
(74) *Attorney, Agent, or Firm* — Schmeiser, Olsen & Watts LLP

(57) ABSTRACT

Provided is a method for operating a distributed database system having distributed node devices for providing interlinked data blocks, in particular in the style of a blockchain, that document transactions between subscribers, wherein transactions between subscribers are protected by transaction data and a cryptographic signature process, involves the cryptographic signature process being defined for each transaction in order to protect the respective transaction, wherein signature information identifying the defined cryptographic signature process is part of the transaction or part of a performance request for the transaction. For each transaction, signature data are then calculated using the
(Continued)

Figure 3:
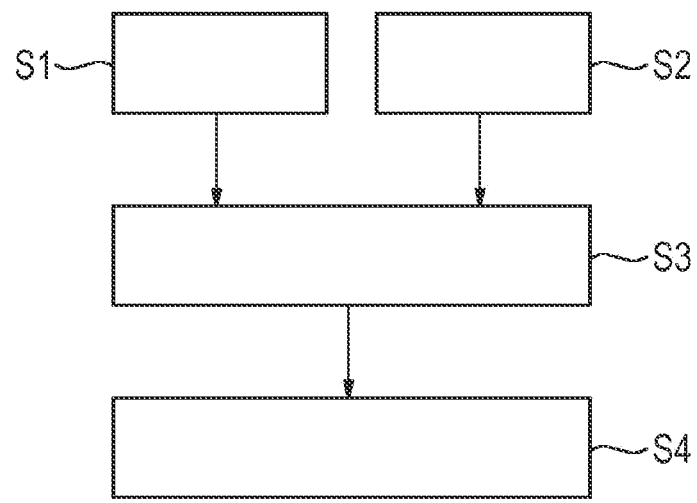

defined cryptographic signature process for at least some of the transaction data or the hash value thereof, and the signature data are added to the transaction data.

15 Claims, 2 Drawing Sheets

(51) Int. Cl.
*G06Q 20/40* (2012.01)
*H04L 9/00* (2022.01)
*H04L 9/32* (2006.01)

(58) Field of Classification Search
USPC .......................................................... 705/44
See application file for complete search history.

(56) References Cited

U.S. PATENT DOCUMENTS

| | | | | |
|---|---|---|---|---|
| 11,570,003 | B2* | 1/2023 | Ding | H04L 9/3236 |
| 2017/0180134 | A1* | 6/2017 | King | H04L 63/045 |
| 2018/0039667 | A1* | 2/2018 | Pierce | H04L 9/3247 |
| 2020/0344051 | A1* | 10/2020 | Ashrafi | H04L 9/0852 |

FOREIGN PATENT DOCUMENTS

| | | |
|---|---|---|
| CN | 101290674 A | 10/2008 |
| CN | 104426886 A | 3/2015 |
| CN | 107426250 A | 12/2017 |
| CN | 108229958 A | 6/2018 |
| CN | 108737114 A | 11/2018 |
| KR | 20000037241 A | 7/2000 |

OTHER PUBLICATIONS

GitHub/ "The Ethereum Book Project/Mastering Ethereum" https://github.com/ethereumbook/ethereumbook, Stand May 10, 2017; 2017.

Blockchainhub: "Blockchain Oracles", https://blockchainhub.net/blockchain-oracles/; 2018.

Antonopoulos Andraes M: "Mastering Bitcoin—Unlocking Digital Cryptocurrencies", O'Reilly Media, Beijing Cambridge Farnham Köln; Sebastopol Tokyo, XP055306939, ISBN: 978-1-4493-7404-4, pp. 113, 123, 158, 179-182, 18-25, 61-63, 161-173; the whole document; 2014.

Baird Leemon: "The Swirlds Hashgraph Consensus Algorithm: Fair, Fast, Byzantine Fault Tolerance", Swirlds Tech Report SWIRLDS-TR-2016-01; 2016.

Diedrich, Henning "Ethereum: Blockchains, Digital Assets, Smart Contracts, Decentralized Autonomous Organizations" CreateSpace Independent Publishing Platform, Sep. 8, 2016 // ISBN-10: 1523930470 // ISBN-13: 978-1523930470.

Anderson Ross: "Security Engineering. A Guide to Building Dependable Distributed Systems"; Wiley; Jan. 2001; 2001.

Baird Leemon: "Overview of Swirlds Hashgraph", Swirlds; 2016.

PCT International Search Report and Written Opinion of International Searching Authority mailed Jan. 2, 2020 corresponding to PCT International Application No. PCT/EP2019/081118 filed Nov. 13, 2019.

Wang, Chuan et al; "Digital Signature Algorithms and Their Comparisons"; Information security and communications privacy; published: Jun. 15, 2008.

Zhai, Sheping et al; "On privacy technology in blockchain"; Journal of Xi' An University of Posts and Telecommunications; published: Sep. 10, 2018; vol. 23; No. 5.

* cited by examiner

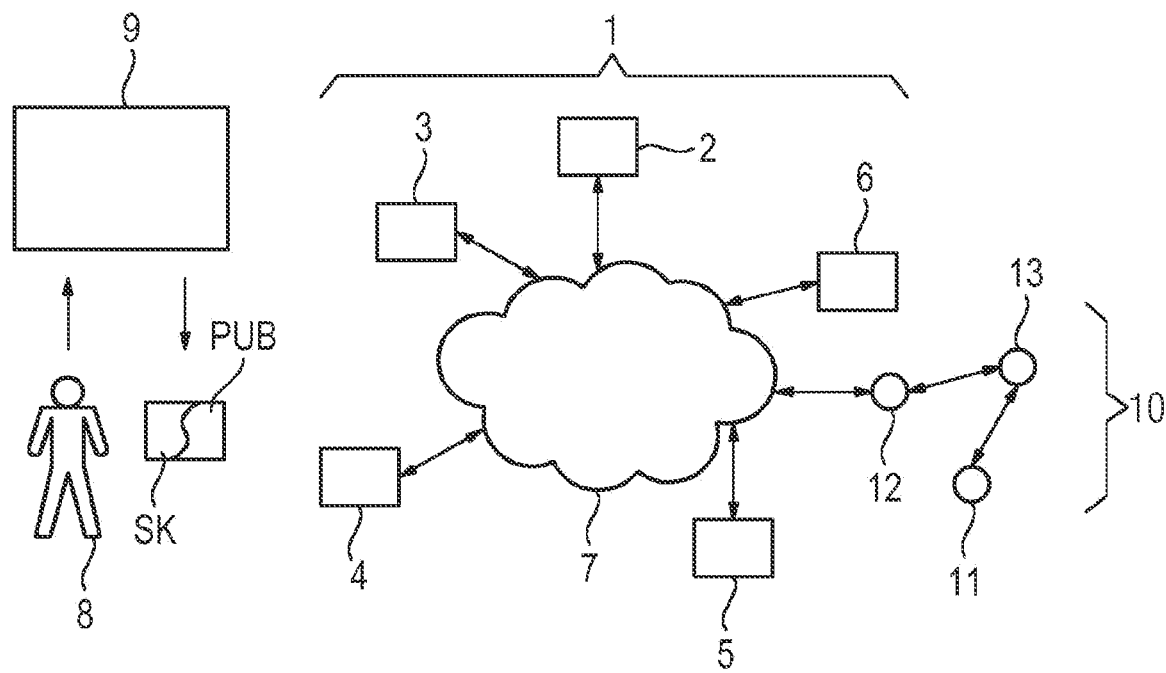
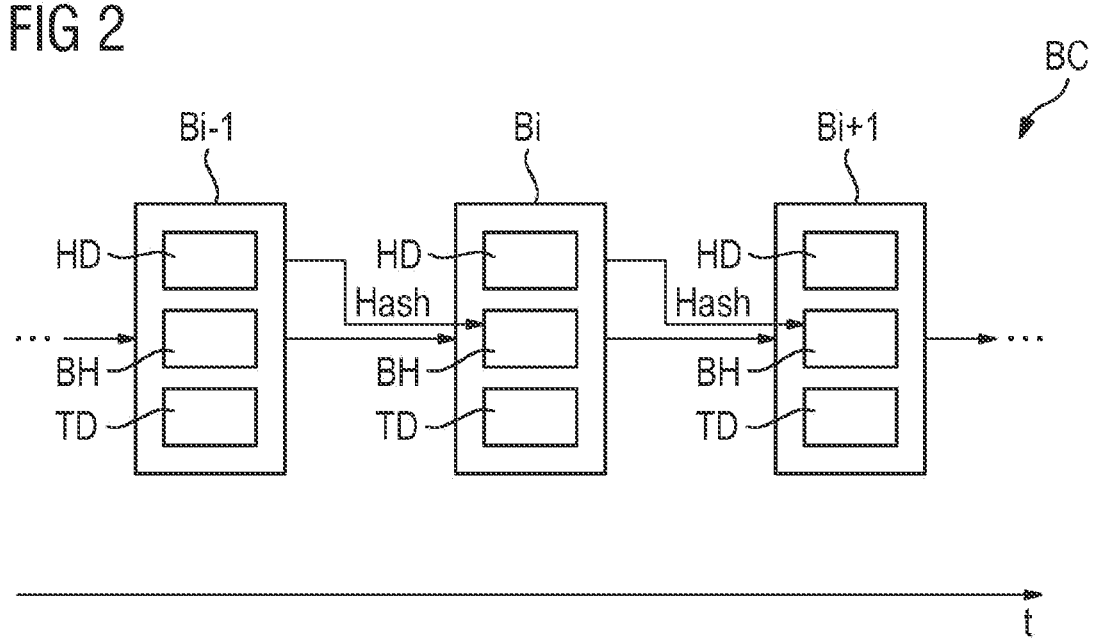

METHOD FOR OPERATING A DISTRIBUTED DATABASE SYSTEM, DISTRIBUTED DATABASE SYSTEM, AND INDUSTRIAL AUTOMATION SYSTEM

CROSS-REFERENCE TO RELATED APPLICATIONS

This application claims priority to PCT Application No. PCT/EP2019/081118, having a filing date of Nov. 13, 2019, which is based on EP Application No. 18215152.2, having a filing date of Dec. 21, 2018, the entire contents both of which are hereby incorporated by reference.

FIELD OF TECHNOLOGY

The following relates to a method for operating a distributed database system such as, for example, a blockchain with the aid of networked node devices. Such a database system is suitable in particular for use in an industrial automation network. In order to be able to perform and document data entries or transactions within a blockchain, such entries are protected cryptographically. It is customary practice, for example, to digitally sign transactions or entries according to a predefined standard.

BACKGROUND

In the case of the known blockchain Bitcoin, which manages a crypto-currency, subscribers or users may have entries with a cash value in the Bitcoin blockchain with the aid of their private cryptographic key. The cryptographic method for protecting the respective database entries for persons or subscribers is based on elliptic curve cryptography (ECC) with a specific key length, namely 256 bits. The key length of the ECDSA signatures used (Elliptic Curve Digital Signature Algorithm: ECDSA) was chosen such that a manipulatory attack is unlikely to impossible. Since future computer powers that can be utilized for attacks on such distributed database systems are unforeseeable, it is uncertain whether the Bitcoin blockchain is equipped with a suitable security level in the long term.

For the Bitcoin blockchain it is envisaged that the last Bitcoins shall arise in 2130. It can be assumed with high probability that at this time elliptic curves with a 256-bit module will no longer offer appropriate security. Doubts about the long-term security of these curves are intensified by the current progress in quantum computers. A conceivable quantum computer having a sufficient number of quantum bits could break all customary crypto methods based on elliptic curves in polynomial time.

It is desirable in this respect to keep the security and robustness of distributed database systems vis a vis crypto-analytical attacks as high and as flexible as possible.

SUMMARY

An aspect relates to enabling improved operation of distributed database systems, in particular of blockchains.

Accordingly, a method for operating a distributed database system having distributed node devices for providing interlinked data blocks. The data blocks can be provided in particular in the manner of a blockchain. The data blocks document transactions between subscribers, wherein transactions between subscribers are protected with the aid of corresponding transaction data and a cryptographic signature method. In the method, for each transaction, the cryptographic signature method for protecting the respective transaction is defined, wherein signature information identifying the defined cryptographic signature method is part of the transaction data or part of a performance request for the transaction.

In particular, for each transaction, signature data are calculated according to the defined cryptographic signature method for at least some of the transaction data or the hash value thereof, and the signature data are added to the transaction data.

The cryptographic signature creates a cryptographic bond or coupling between the subscriber and a requested transaction or the respective data entry and satisfies specific security requirements in the process. One example of a security level is a key length for example.

As a result of the definition of the cryptographic signature method to be used in the context of every transaction performance or confirmation, operation of the database system becomes more flexible and more secure. This makes it possible to change the security level of the signature method over the lifetime of the database system and to adapt it to progress in crypto-analysis.

In security methods based on secret information, such as a cryptographic private key, for example, an applicable security level may be the average number of elementary operations required by the most efficient known algorithm in order to determine the secret information. In the case of a security level of 80 bits, an attacker must perform $2^{80}$ elementary operations in order to find the private key. The security level can then be said to be 80 bits. Other measures are also conceivable for the respective security level, such as a key length or a parameter of elliptic curves.

The definition of the security level by using a specific cryptographic signature method is implemented for example for all future transactions as long as a new cryptographic signature method, in particular with increased security, is not defined. In an embodiment, no transactions can be performed without specifying the signature information, for example in the manner of a reference, pointer, program code for the signature method to be used and/or a parameter for the signature method.

In embodiments, the signature method has a program code for performing the defined cryptographic signature method. The cryptographic signature method can be implemented as executable code and can be present in a manner stored in the database system. One possible implementation of the method provides one or more smart contracts that instigate(s) one corresponding cryptographic signature method or different cryptographic signature methods. In this respect, variants of the method provide for a predefinable cryptographic signature method in the manner of a smart contract to be provided for or in the distributed database system.

It is also conceivable for the signature information to have a pointer to a program code for performing the defined cryptographic signature method.

In one embodiment of the method, the signature information is digitally signed with the aid of the defined cryptographic signature method. Alternatively, firstly a hash value for the signature information can be generated, and then the hash value can be digitally signed with the aid of the defined cryptographic signature method. The signed and/or hashed signature information is then appended to the transaction data.

The respective signature is part of a transaction or transaction request or of the transaction data.

By way of example, in a change transaction for all subsequent transactions a new cryptographic signature method for protecting the respective transaction can be defined. This is done in particular only if a predefined proportion of subscribers agrees to a change transaction with the use of the currently defined cryptographic signature method.

In embodiments, all subscribers of the database system must agree. It is also possible to determine a predefined necessary majority, e.g., two thirds or 50% for changing the signature method.

In embodiments, a group of subscribers, for transactions among subscribers of the group, can agree on a specific digital signature method and define it for future subsequent transactions.

In embodiments, the cryptographic signature method to be used is defined for a specific period of time. It is furthermore conceivable to define the signature method for a maximum number of transactions, wherein the signature method must be determined anew after the period of time or number of transactions has expired.

In embodiments, a new defined signature method must have a higher cryptographic security level than the currently defined signature method.

In embodiments, the respective cryptographic signature method interlinks a cryptographic key pair, wherein a currently applicable key pair is assigned to each subscriber. Alternatively or additionally, the signature method can be implemented by way of elliptic curve cryptography (ECC).

In ECC, discrete algorithm problems are considered and the curve parameters are defined. In this case, the security level of ECC is essentially determined by the key length. In relation to a distributed database system and the cryptographic binding of data entries to subscribers, the security level of the defined cryptographic signature method can be the key length used.

The cryptographic signature method can be implemented on the basis of elliptic curve cryptography (ECC) and the signature information has for example the key length for the ECC, in particular as a number of bits.

In an embodiment, the cryptographic signature method is implemented on the basis of post-quantum cryptography (PQC). The definition as a PQC method enables protection against attacks with the aid of quantum computers that can possibly decrypt asymmetric crypto-systems used heretofore. Therefore, during operation of the distributed database, a previous cryptographic signature method can be replaced by a new signature method that is more robust with regard to quantum computer attacks. In particular, definition as a method according to the RFC 8391 standard in the version currently on the filing date of this patent application is conceivable. XMSS in particular, is suitable as signature method.

In embodiments, provision is made for the interlinked data blocks which document transactions between subscribers to comprise data blocks which are protected with the aid of different cryptographic signature methods.

In particular, a blockchain operated with the aid of the proposed method can comprise transactions with signatures of different security levels. Old data entries that are documented in data blocks and are at risk can be rescued by being transferred to newer data blocks that are protected in accordance with the currently defined signature method.

The cryptographic signature method cryptographically interlinks a cryptographic key pair, in particular. A current key pair can then be assigned to each subscriber. In embodiments, it is ensured that exactly one subscriber is present for each key pair. In principle, subscribers can also have a plurality of key pairs.

In embodiments of the method, furthermore at least one of the following steps is performed for each subscriber:
  allocating a digital signature key to the subscriber, wherein the digital signature key corresponds to the currently defined cryptographic signature method;
  digitally signing a transaction request of the subscriber with the aid of the digital signature key allocated to the subscriber in order to generate a digitally signed transaction request; and
  confirming the transaction if the digital signature is recognized as valid, and if the transaction is consistent with a transaction history of the blockchain as distributed database system.

A digital signature key can also be allocated actually by the respective subscriber. By way of example, a subscriber generates the key pair utilized by the subscriber.

In embodiments, the interlinked data blocks document transactions concerning a resource, in particular a cryptocurrency. A security level of the cryptographic signature method is then defined in particular depending on a value or an amount of the resource documented in the context of the transaction. In this respect, the transaction security can be adapted to the value of the transaction.

In the method, the interlinked data blocks can document transactions concerning a resource, in particular a cryptocurrency, and the transaction is performed by way of checking entities checking the signature in the transaction data. The checking then necessitates paying an amount of the managed resource to the checking entities, wherein the amount depends on the calculation complexity of the signature check. The checking entity used can be network devices that provide computing power for the cryptographic calculations in accordance with the defined signature method. The greater the calculation complexity, the greater the level of the transaction costs determined, for example. In particular, denial of service attacks can be prevented as a result.

In embodiments, operation is effected over and above the steps mentioned above in accordance with a known blockchain algorithm. For example, ethereum, IOTA or Bitcoin modifications are conceivable.

A distributed database system is proposed, furthermore, which comprises a plurality of node devices for providing interlinked data blocks, which are interlinked in particular in the manner of a blockchain. Each node device is configured to document transactions between subscribers in accordance with a predefined blockchain algorithm, wherein the blockchain algorithm instigates the performance of a method described above and below by the node devices.

A node device is proposed, in particular, which is configured in such a way that it is usable as a node device in a distributed database system and operates in accordance with the blockchain algorithm as described above and below.

Furthermore, an industrial automation network having a distributed database system as described above and below is proposed, wherein the database system is configured for documenting and controlling transactions for field devices in the automation network.

In particular, field devices which are provided with addresses can be considered as subscribers. Such field devices can generate sensor data or control data that are stored in a distributed manner with the aid of the node devices. Since only transaction requests signed according to the current digital are used for performing transactions, the security of such industrial automation networks can be improved. The field devices can also themselves constitute node devices in the database system.

The technology of blockchains or "distributed ledgers" is currently a technology that is being intensively discussed and that can be realized in particular as a distributed database system. Besides applications for decentralized payment systems (e.g. Bitcoin), new application possibilities are being developed in the financial industry. In particular, transactions between companies can be realized by this means without mediators or a clearing house, in a manner protected against manipulation. This enables new business models without a trustworthy mediator, it reduces the transaction costs, and new digital services can be offered in a flexible manner, typically without the need to set up trust relationships and an infrastructure set up specifically for this. A transaction data set (or transaction for short) protected by a blockchain comprises program code, for example, which can also be referred to as a so-called "smart contract".

The respective unit, for example a node, a computing unit or control unit, can be implemented in terms of hardware technology and/or else in terms of software technology. In the case of an implementation in terms of hardware technology, the respective unit can be embodied as an apparatus or as part of an apparatus, for example as a computer or as a microprocessor or as a control computer of a vehicle. In the case of implementation in terms of software technology, the respective unit can be embodied as a computer program product (non-transitory computer readable storage medium having instructions, which when executed by a processor, perform actions), as a function, as a routine, as part of a program code or as an executable object.

A computer program product is proposed, furthermore, which instigates the performance of the method as explained above on one or more program-controlled devices.

A computer program product, such as e.g., a computer program means or a computer program, can be provided or supplied for example as a storage medium, such as e.g. a memory card, a USB stick, a CD-ROM a DVD, or else in the form of a downloadable file from a server in a network. This can be done for example in a wireless communication network by the transfer of a corresponding file with the computer program product or the computer program means or computer program.

The embodiments and features described for the proposed apparatus are correspondingly applicable to the proposed method.

Further possible implementations of embodiments of the invention also comprise not explicitly mentioned combinations of features or embodiments described above or below with regard to the exemplary embodiments. Here the person skilled in the art will also add individual aspects as improvements or supplementations to the respective basic form of embodiments of the invention.

Further advantageous configurations and aspects of embodiments of the invention are the subject matter of the dependent claims and of the exemplary embodiments of the invention described below. Embodiments of the invention are explained in greater detail hereinafter on the basis of embodiments with reference to the accompanying figures.

Unless indicated otherwise in the following description, the terms "perform", "calculate", "computer-aided", "compute", "ascertain", "generate", "configure", "reconstruct" and the like relate to actions and/or processes and/or processing steps which change and/or generate data and/or convert data into other data, wherein the data can be represented or be present in particular as physical variables, for example as electrical pulses. In particular, the expression "computer" should be interpreted as broadly as possible to cover in particular all electronic devices having data processing properties. Computers can thus be for example personal computers, servers, programmable logic controllers (PLCs), handheld computer systems, pocket PC devices, mobile radio devices and other communication devices which can process data in a computer-aided manner, processors and other electronic devices for data processing.

In association with embodiments of the invention, "computer-aided" can be understood to mean for example an implementation of the method in which in particular a processor performs at least one method step of the method.

In association with embodiments of the invention, a processor can be understood to mean for example a machine or an electronic circuit. A processor can be in particular a central processing unit (CPU), a microprocessor or a microcontroller, for example an application-specific integrated circuit or a digital signal processor, possibly in combination with a storage unit for storing program instructions, etc. A processor can for example also be an IC (Integrated Circuit), in particular an FPGA (Field Programmable Gate Array) or an ASIC (Application-Specific Integrated Circuit), or a DSP (Digital Signal Processor) or a graphic processing unit (GPU). Moreover, a processor can be understood to mean a virtualized processor, a virtual machine or a soft CPU. It can for example also be a programmable processor which is equipped with configuration steps for performing the stated method according to embodiments of the invention or is configured with configuration steps in such a way that the programmable processor implements the features according to embodiments of the invention of the method, of the component, of the modules, or of other aspects and/or partial aspects of embodiments of the invention.

In association with embodiments of the invention, a "storage unit" or "storage module" and the like can be understood to mean for example a volatile memory in the form of main memory (Random-Access Memory, RAM) or a permanent memory such as a hard disk or a data carrier.

In association with embodiments of the invention, a "module" can be understood to mean for example a processor and/or a storage unit for storing program instructions. By way of example, the processor is specifically designed to execute the program instructions in such a way that embodiments of the processor execute functions for implementing or realizing the method according to the invention or a step of the method according to embodiments of the invention. A module can for example also be a node of the distributed database system that realizes for example the specific functions/features of a corresponding module. The respective modules can for example also be embodied as separate or independent modules. For this purpose, the corresponding modules can comprise further elements, for example. These elements are for example one or more interfaces (e.g., database interfaces, communication interfaces—e.g., network interface, WLAN interface) and/or an evaluation unit (e.g. a processor) and/or a storage unit. By the interfaces, for example, data can be exchanged (e.g. received, communicated, transmitted or provided). By the evaluation unit, data can be compared, checked, processed, assigned or calculated for example in a computer-aided manner and/or in an automated manner. By the storage unit, data can be stored, retrieved or provided for example in a computer-aided manner and/or in an automated manner.

In association with embodiments of the invention, "comprise", in particular with regard to data and/or information, can be understood to mean for example (computer-aided) storage of corresponding information and/or of a corresponding datum in a data structure/data set (which e.g., is in turn stored in a storage unit).

In association with embodiments of the invention, "assign", in particular with regard to data and/or information, can be understood to mean for example a computer-aided assignment of data and/or information. By way of example, a first datum, for this purpose, by a storage address or a unique identifier (UID), is assigned a second datum e.g., by the first datum being stored together with the storage address or the unique identifier of the second datum together in a data set.

In association with embodiments of the invention, "providing", in particular with regard to data and/or information, can be understood to mean for example computer-aided providing. The providing is effected for example via an interface (e.g. a database interface, a network interface, an interface to a storage unit). Via the interface, for example, during providing, corresponding data and/or information can be communicated and/or transmitted and/or retrieved and/or received.

In association with embodiments of the invention, "providing" can also be understood to mean for example loading or storing, for example a transaction with corresponding data. This can be done for example on or by a storage module. "Providing" can for example also be understood to mean transferring (or transmitting or communicating) corresponding data from one node to another node of the blockchain or of the distributed database system (or the infrastructure thereof).

In association with embodiments of the invention, "smart contract process" can be understood to mean in particular execution of a program code (e.g., of the control commands) in a process by the distributed database system or the infrastructure thereof.

In association with embodiments of the invention, a "checksum", for example a data block checksum, a data checksum, a node checksum, a transaction checksum, a linking checksum or the like, can be understood to mean for example a cryptographic checksum or cryptographic hash or hash value that is formed or calculated in particular by a cryptographic hash function by way of a data set and/or data and/or one or more of the transactions and/or a partial area of a data block (e.g. the block header of a block of a blockchain or data block header of a data block of the distributed database system or only a portion of the transactions of a data block). A checksum can be in particular checksum(s) or hash value(s) of a hash tree (e.g., Merkle tree, Patricia tree). Furthermore, it can also be understood to mean in particular a digital signature or a cryptographic message authentication code. By the checksums, at different levels of the database system, for example, it is possible to realize cryptographic protection/protection against manipulation for the transactions and the data (sets) stored therein. If high security is required, for example, the checksums are generated and checked at the transaction level, for example. If the security required is not as high, the checksums are generated and checked for example at the block level (e.g. over the entire data block or only over a portion of the data block and/or a portion of the transactions).

In association with embodiments of the invention, a "data block checksum" can be understood to mean a checksum that is calculated for example over a portion or all transactions of a data block. A node can then check/establish the integrity/authenticity of the corresponding portion of a data block by the data block checksum, for example. Additionally or alternatively, the data block checksum may in particular also have been formed over transactions of a preceding data block/predecessor data block of the data block. In this case, the data block checksum can in particular also be realized by a hash tree, for example a Merkle tree or a Patricia tree, wherein the data block checksum is in particular the root checksum of the Merkle tree or of a Patricia tree or of a binary hash tree. In particular, transactions are safeguarded by further checksums from the Merkle tree or Patricia tree (e.g., using the transaction checksums), wherein in particular the further checksums are leaves in the Merkle tree or Patricia tree. The data block checksum can thus safeguard the transactions for example by the root checksum being formed from the further checksums. The data block checksum can be calculated in particular for transactions of a specific data block of the data blocks. In particular, such a data block checksum can influence a data block succeeding the specific data block in order to link this succeeding data block for example with its preceding data blocks and in particular thus to make an integrity of the distributed database system checkable. By this means, the data block checksum can for example perform the function of the linking checksum or influence the linking checksum. The header of a data block (e.g., of a new data block or of the data block for which the data block checksum was formed) can comprise the data block checksum, for example.

In association with embodiments of the invention, "transaction checksum" can be understood to mean a checksum which is formed in particular over a transaction of a data block. In addition, for example a calculation of a data block checksum for a corresponding data block can be accelerated since, for this purpose, for example already calculated transaction checksums can be used straightaway as leaves of a Merkle tree, for example.

In association with embodiments of the invention, a "linking checksum" can be understood to mean a checksum which in particular is ascertained for or referenced to a respective data block of the distributed database system with the aid of the preceding data block of the distributed database system (often referred to as "previous block hash", in particular, in the technical literature). For this purpose, a corresponding linking checksum is formed in particular for the corresponding preceding data block. As linking checksum, for example, a transaction checksum or the data block checksum of a data block (that is to say a present data block of the distributed database system) can be used to link a new data block with a (present) data block of the distributed database system. However, it is also possible, for example, for a checksum to be formed over a header of the preceding data block or over the entire preceding data block and to be used as linking checksum. This can for example also be calculated for a plurality or all of the preceding data blocks. It is also possible to realize a procedure for example in which the linking checksum is formed over the header of a data block and the data block checksum. However, a respective data block of the distributed database system comprises in each case a linking checksum which was calculated for, or refers to, a data block preceding the respective data block, in particular the data block directly preceding the respective data block. It is also possible, for example, for a corresponding linking checksum also to be formed only over a portion of the corresponding data block (e.g., preceding data block). As a result, a data block comprising an integrity-protected portion and an unprotected portion can be realized, for example. A data block whose integrity-protected portion is invariable and whose unprotected portion can also still be changed later could thus be realized, for example. In this case, integrity-protected should be understood to mean in particular that an alteration of integrity-protected data is able to be established by a checksum.

The data which are stored in a transaction of a data block, for example, can be provided in particular in various ways. Instead of the data, e.g., user data such as measurement data or data/ownership concerning assets, for example a transaction of a data block can comprise only the checksum for these data. In this case, the corresponding checksum can be realized in various ways. This can be e.g., a corresponding data block checksum of a data block (with the corresponding data) of a different database or of the distributed database system, a transaction checksum of a data block with the corresponding data (of the distributed database system or of a different database) or a data checksum that was formed over the data.

In addition, the corresponding transaction can also comprise a reference or an indication concerning a storage location (e.g., an address of a file server and indications of where the corresponding data may be found on the file server; or an address of a different distributed database comprising the data). The corresponding data could then for example also be provided in a further transaction of a further data block of the distributed database system (e.g. if the corresponding data and the associated checksums are comprised in different data blocks). However, it is also conceivable, for example, for these data to be provided via a different communication channel (e.g., via a different database and/or a cryptographically secured communication channel).

Moreover, in addition to the checksum, for example, it is possible to store an additional data set (e.g., a reference or an indication concerning a storage location) in the corresponding transaction, which indicates in particular a storage location where the data can be retrieved. That is advantageous in particular so as to minimize a data size of the blockchain or of the distributed database system.

In association with embodiments of the invention, "security-protected" can be understood to mean for example protection that is realized by a cryptographic method, in particular. By way of example, this can be realized by use of the distributed database system for providing or transferring or transmitting corresponding data/transactions. This is achieved by a combination of the different (cryptographic) checksums by virtue of the latter interacting synergistically, in particular, in order to improve for example, the security or the cryptographic security for the data of the transactions. In other words, in association with embodiments of the invention, "security-protected" can in particular also be understood to mean "cryptographically protected" and/or "manipulation-protected", wherein "manipulation-protected" can also be referred to as "integrity-protected".

In association with embodiments of the invention, "linking (the) data blocks of a distributed database system" can be understood to mean for example that data blocks each comprise information (e.g., linking checksum) that refers to or references one other data block or a plurality of other data blocks of the distributed database system.

In association with embodiments of the invention, "inserting into the distributed database system" and the like can be understood to mean for example that in particular a transaction or the transactions or a data block with its transactions is/are communicated to one or more nodes of a distributed database system. If these transactions are validated successfully (e.g. by the node(s)), for example, these transactions are linked in particular as a new data block with at least one present data block of the distributed database system. For this purpose, the corresponding transactions are stored in a new data block, for example. In particular, this validating and/or linking can be effected by a trustworthy node (e.g. a mining node, a blockchain oracle or a blockchain platform). In particular, a blockchain platform can be understood here to mean a blockchain as service, as proposed in particular by Microsoft or IBM. In particular, a trustworthy node and/or a node can in each case store a node checksum (e.g. a digital signature) in a data block (e.g. in the data block generated and validated by them, which is then linked) in order in particular to enable an identifiability of the creator of the data block and/or to enable an identifiability of the node. In this case, the node checksum indicates which node has linked for example the corresponding data block with at least one other data block of the distributed database system.

In association with embodiments of the invention, "transaction" or "transactions" can be understood to mean for example a smart contract, a data structure or a transaction data set that comprises in particular in each case one of the transactions or a plurality of transactions. In association with embodiments of the invention, "transaction" or "transactions" can for example also be understood to mean the data of a transaction of a data block of a blockchain. A transaction can comprise in particular a program code that realizes a smart contract, for example. By way of example, in association with embodiments of the invention, transaction can also be understood to mean a control transaction and/or confirmation transaction. Alternatively, a transaction can be for example a data structure that stores data (e.g., the control commands and/or contract data and/or other data such as video data, user data, measurement data, etc.).

In particular, "storing transactions in data blocks", "storing transactions" and the like should be understood to mean direct storing or indirect storing. In this case, direct storing can be understood to mean for example that the corresponding data block (of the distributed database system) or the corresponding transaction (of the distributed database system) comprises the respective data. In this case, indirect storing can be understood to mean for example that the corresponding data block or the corresponding transaction comprises a checksum and optionally an additional data set (e.g., a reference or an indication concerning a storage location) for corresponding data and, consequently, the corresponding data are not stored directly in the data block (or the transaction) (i.e. instead only a checksum for these data). In particular, when storing transactions in data blocks, it is possible to validate these checksums, for example, as explained for example under "inserting into the distributed database system".

In association with embodiments of the invention, a "program code" (e.g., a smart contract) can be understood to mean for example one program instruction or a plurality of program instructions, which are stored in particular in one or a plurality of transactions. The program code is executable, in particular, and is executed by the distributed database system, for example. This can be realized by an execution environment (e.g., of a virtual machine), for example, wherein the execution environment and respectively the program code are Turing complete. The program code is executed by the infrastructure of the distributed database system. In this case, for example, a virtual machine is realized by the infrastructure of the distributed database system.

In association with embodiments of the invention, a "smart contract" can be understood to mean for example an executable program code (see, in particular, the definition of "program code"). The smart contract is stored in a transaction of a distributed database system (e.g. a blockchain), for example in a data block of the distributed database system. By way of example, the smart contract can be executed in the same way as explained in the definition of "program code", in particular in association with embodiments of the invention.

In association with embodiments of the invention, "proof-of-work verification" can be understood to mean for example solving a computationally intensive task which is to be solved in particular depending on the data block content/content of a specific transaction. Such a computationally intensive task is for example also referred to as a cryptographic puzzle.

In association with embodiments of the invention, a "distributed database system", which can for example also be referred to as a distributed database, can be understood to mean for example a decentralized distributed database, a blockchain, a distributed ledger, a distributed storage system, a distributed ledger technology (DLT) based system (DLTS), an audit-proof database system, a cloud, a cloud service, a blockchain in a cloud or a peer-to-peer database. Moreover, it is possible to use, for example various implementations of a blockchain or a DLTS. There is, for example, a blockchain or a DLT-based system, which operates by a directed acyclic graph (DAG), a cryptographic puzzle, a Hashgraph or a combination of the implementation variants mentioned. Moreover, various consensus methods (referred to as consensus algorithms) can be implemented, for example. This can be for example a consensus method by a cryptographic puzzle, gossip about gossip, virtual voting or a combination of the methods mentioned (e.g., gossip about gossip combined with virtual voting). In particular, proof-of-state, proof-of-authority or proof-of-state variants are known besides the proof-of-work implementation for transaction validation. If a blockchain is used, for example, then this can be implemented in particular by a Bitcoin-based realization or an Ethereum-based realization. A "distributed database system" can for example also be understood to mean a distributed database system of which at least some of its nodes and/or devices and/or infrastructure are realized by a cloud. By way of example, the corresponding components can be realized as nodes/devices in the cloud (e.g., as a virtual node in a virtual machine). This can be effected for example by VM-Ware, Amazon Web Services or Microsoft Azure. On account of the high flexibility of the implementation variants explained, in particular partial aspects of the implementation variants mentioned can also be combined with one another, e.g., by using a Hashgraph as a blockchain, wherein the blockchain itself can e.g. also be blockless.

If for example a directed acyclic graph (DAG) is used, in particular transactions or blocks or nodes of the graph are connected to one another via directed edges. This means, in particular, that (all) edges (always) have the same direction, in a similar manner to time, for example. As a result of the unique, acyclic path of the edges, the temporal succession of the transactions involved is defined uniquely and evidentially. Acyclic here means, in particular, that there are no loops when moving through the graph.

The distributed database system can be for example a public distributed database system (e.g., a public blockchain) or a closed (or private) distributed database system (e.g., a private blockchain).

If a public distributed database system is involved, for example, this means that new nodes and/or devices can join the distributed database system or be accepted by the latter without authorization verifications or without authentication or without log-on information or without credentials. In particular, the operators of the nodes and/or devices can remain anonymous in such a case.

If the distributed database system is a closed distributed database system, for example, new nodes and/or devices require for example a valid authorization verification and/or valid authentication information and/or valid credentials and/or valid log-on information in order to be able to join the distributed database system or in order to be accepted by the latter.

A distributed database system can also be for example a distributed communication system for data exchange. This can be for example a network or a peer-2-peer network.

In association with embodiments of the invention, "data block", which can also be referred to as "link" or "block" in particular depending on context and realization, can be understood to mean for example a data block of a distributed database system (e.g. a blockchain or a peer-to-peer database), which in particular is realized as a data structure and comprises in each case one of the transactions or a plurality of the transactions. In one implementation, for example, the database (or the database system) can be a DLT based system (DLTS) or a blockchain and a data block can be a block of the blockchain or of the DLTS. A data block can comprise for example indications concerning the size (data size in bytes) of the data block, a data block header, a transaction counter and one or more transactions. The data block header can comprise for example a version, a linking checksum, a data block checksum, a time stamp, a proof-of-work verification and a nonce (one-off value, random value or counter used for the proof-of-work verification). A data block can for example also be only a specific storage area or address area of the entire data stored in the distributed database system. It is thus possible to realize for example blockless distributed database systems, such as e.g., the IoT chain (ITC), IOTA, and Byteball. In this case, in particular, the functionalities of the blocks of a blockchain and of the transactions are combined with one another in such a way that e.g., the transactions themselves safeguard the sequence or chain of transactions (of the distributed database system) (that is to say, in particular, are stored in a security-protected manner). For this purpose, with a linking checksum, for example, the transactions themselves can be linked with one another, by a separate checksum or the transaction checksum of one or more transactions serving as linking checksum, which is concomitantly stored in the corresponding new transaction when a new transaction is stored in the distributed database system. In such an embodiment, a data block can for example also comprise one or more transactions, wherein in the simplest case for example a data block corresponds to a transaction.

In association with embodiments of the invention, "nonce" can be understood to mean for example a cryptographic nonce (abbreviation of: "used only once" or "number used once"). In particular, a nonce denotes an individual combination of numbers or letters that is used once in the respective context (e.g., transaction, data transfer).

In association with embodiments of the invention, "data blocks preceding a (specific) data block of the distributed database system" can be understood to mean for example that data block of the distributed database system which directly precedes in particular a (specific) data block. Alternatively, "data blocks preceding a (specific) data block of the distributed database system" can in particular also be understood to mean all data blocks of the distributed database system which precede the specific data block. As a result, by way of example, the linking checksum or the transaction checksum can be formed in particular only over the data block (or the transactions thereof) directly preceding the specific data block or over all data blocks (or the transactions thereof) preceding the first data block.

In association with embodiments of the invention, a "blockchain node", "node", "node of a distributed database system" and the like can be understood to mean for example devices (e.g., field devices, cellular phones), computers, smartphones, clients or subscribers that carry out operations with the distributed database system (e.g. a blockchain). Such nodes can for example execute transactions of a distributed database system or the data blocks thereof or introduce or link new data blocks with new transactions into the distributed database system by new data blocks. In particular, this validating and/or linking can be effected by a trustworthy node (e.g. a mining node) or exclusively by trustworthy nodes. A trustworthy node is for example a node that has additional security measures (e.g., firewalls, access restrictions to the node or the like) in order to prevent a manipulation of the node. Alternatively or additionally, by way of example, during the linking of a new data block with the distributed database system, a trustworthy node can store a node checksum (e.g. a digital signature or a certificate) in the new data block. A verification can thus be provided, in particular, which indicates that the corresponding data block was inserted by a specific node or indicates its origin. The devices (e.g., the corresponding device) are for example devices of a technical system and/or an industrial installation and/or an automation network and/or a manufacturing installation which in particular are also a node of the distributed database system. In this case, the devices can be for example field devices or devices in the Internet of Things which in particular are also a node of the distributed database system. Nodes can for example also comprise at least one processor in order to carry out e.g., their computer-implemented functionality.

In association with embodiments of the invention, a "blockchain oracle" and the like can be understood to mean for example nodes, devices or computers that are deemed to be reliable data sources. The data obtained by nodes deemed to be a "blockchain oracle" are regarded as correct or not having been manipulated, for example, because such nodes have e.g. a security module comprising for example software protection mechanisms (e.g. cryptographic methods), mechanical protection devices (e.g. a lockable housing) or electrical protection devices (e.g. tamper protection or a protection system that erases the data of the security module in the event of impermissible use/handling of the blockchain oracle). In this case, the security module can comprise cryptographic keys, for example, which are necessary for calculating the checksums (e.g., transaction checksums or node checksums).

In association with embodiments of the invention, a "computer" or a "device" can be understood to mean for example a computer (system), a client, a smartphone, a device or a server, each of which is arranged outside the blockchain or is not a subscriber of the distributed database system (e.g. of the blockchain) (that is to say does not carry out operations with the distributed database system or only interrogates the latter, but without carrying out transactions, inserts data blocks or calculates proof-of-work verifications). Alternatively, a computer can in particular also be understood to mean a node of the distributed database system. In other words, a device can in particular be understood to mean a node of the distributed database system or else a device outside the blockchain or the distributed database system. A device outside the distributed database system can for example access the data (e.g., transactions or control transactions) of the distributed database system and/or be driven by nodes (e.g., by a smart contract and/or blockchain oracle). If for example driving or control of a device (e.g., a device embodied as a node or a device outside the distributed database system) is realized by a node, this can be effected e.g. by a smart contract stored in particular in a transaction of the distributed database system.

The embodiments and features described for the proposed distributed database system are correspondingly applicable to the proposed method for operating a distributed database system.

Further possible implementations of embodiments of the invention also comprise not explicitly mentioned combinations of features or embodiments described above or below with regard to the exemplary embodiments. In this case, the person skilled in the art will also add individual aspects as improvements or supplementations to the respective basic form of embodiments of the invention.

BRIEF DESCRIPTION

Some of the embodiments will be described in detail, with references to the following Figures, wherein like designations denote like members, wherein:

FIG. 1 shows a schematic illustration of one embodiment of an industrial automation network comprising a distributed database system;

FIG. 2 schematically shows one embodiment of a blockchain;

FIG. 3 shows a flow diagram for a method for operating a blockchain; and

Figure 4:
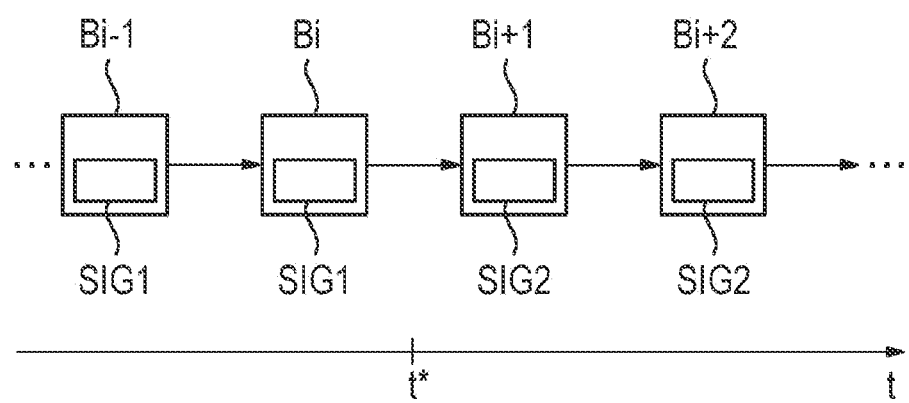

FIG. 4 schematically shows a further embodiment of a blockchain.

DETAILED DESCRIPTION

FIG. 1 shows a schematic illustration of one embodiment of an industrial automation network in which a distributed database system is used. In this respect, FIG. 1 illustrates a distributed database system in the manner of a blockchain 1, which is illustrated in more specific detail in FIG. 2. In this case, the distributed database system 1 comprises internet-worked node devices 2-6.

The node devices are coupled to a network 7 and in principle, may exchange data with one another. By way of example, computers with blockchain clients or field devices and mobile terminals are suitable as node devices 2-6. In the exemplary embodiment illustrated, for example, sensor data generated by field devices 11, 12, 13 of an industrial automation network 10 can be stored. The storage is effected in the manner of transactions between subscribers. By way of example, a transaction for a subscriber, for example a sensor device 11, can consist in documenting or storing a sensor value. "Subscriber" is understood hereinafter to mean any entity with respect to which allocated information is entered within the distributed database system 1. Analogously, it is possible to store information by way of a transaction within the blockchain BC.

In FIG. 1, a general subscriber 8 is illustrated on the left. In order to perform transactions within a blockchain BC, the subscribers 8 have to be identified by blockchain identification data, which can be e.g., a network address. Public keys of a key-lock pair are often also used as a blockchain identification datum. This is indicated in FIG. 1 by a private key SK and a public key PUB for the subscriber 8. The keys SK, PUB are interlinked by way of a cryptographic method and serve to cryptographically protect transactions in the blockchain BC. Transactions between subscribers or changes of database entries which are documented by the data blocks explained below are protected here by a cryptographic security method in the manner of signed data blocks.

A blockchain BC is indicated schematically in FIG. 2. In a blockchain BC, data blocks Bi are generated successively, wherein the successive data blocks, designated by Bi, Bi+1 and Bi−1 in FIG. 1, are cryptographically interlinked. By way of example, temporally the most up to date data block Bi+1 in FIG. 2, which data block—like the other preceding data blocks Bi and Bi−1 as well, —comprises header data HD, hashed data block data BH and transaction data TD, is interlinked with the preceding data block Bi by a hash value of the preceding data block Bi being written. This is identified in FIG. 2 in each case by the curved arrows with the added designation "Hash". All data—in particular the transaction history of the blockchain BC—influence the hash value formation of the respective preceding data block, and so an unnoticed manipulation of data, in particular of transaction data, is very unlikely.

During the generation of a new data block that is intended to document requested transactions between subscribers, the node devices 2-6 that make computer capacity available check whether or not the imminent transactions conflict with the previous transaction history. By way of example, a transaction is confirmed if the majority of the node devices classify the transaction as consistent with regard to the transaction history.

Cryptographically protected linking is therefore effected, a cryptographic signature method being used for each transaction. In the case of conventional blockchains, a specific cryptographic method is selected at the start of the blockchain and used for the lifetime thereof.

In the case of the proposed method for operating the distributed database 1, the signature method used for protection—for example by the specification of a complete parameter set that uniquely characterizes the signature method to be used, wherein in particular the respective key length—is flexibly definable for each transaction. A link to such parameter data identifying the cryptographic signature method or to executable program code that implements the signature calculation is also conceivable. As a result, the cryptographic security level of the blockchain can also be adapted to the respective current requirements. This is indicated schematically in FIG. 3, which illustrates method steps proceeding in an operating method for the distributed database system according to FIG. 1 in the manner of a blockchain according to FIG. 2.

In step S1, a transaction request is generated by a subscriber 8. By way of example, crediting of an amount of a crypto-currency is intended to be effected for a specific network address allocated to the respective subscriber 8. The transaction request must be signed with the aid of a cryptographic key and an associated cryptographic signature method.

During the operation of the distributed database system 1, the cryptographic signature method to be used is defined for each transaction (S2). For less security-relevant transactions, for example, an ECDSA method with a 160-bit module can be used in order to save computing power. In the case of currently applicable security-relevant transactions, for example, an ECDSA method with a 256-bit module is used. If a 256-bit module no longer appears to be secure enough in the future, a 320-bit module is defined for transactions in the database system 1.

For defining the cryptographic signature method, each transaction request, or a performance request for the transaction, contains signature information. The signature information identifies the signature method to be used for example by the specification of a key length. The signed transaction request is then checked with the aid of a public key in accordance with the defined key length and the associated method, e.g., ECDSA.

During the operation of the blockchain BC by the distributed database system 1, the network address of the subscriber as a blockchain identification datum together with the requested transaction can be digitally signed. By way of example, the certification authority 9 (cf. FIG. 1) generates a pair comprising a public verification key PUB and a private cryptographic key SK as digital signature key in accordance with the defined cryptographic signature method. The public key PUB is assigned to the subscriber 8 with the aid of a digital certificate, for example.

In step S3, therefore, the transaction request is provided with the signature or signed with the use of the defined cryptographic signature method identified by the signature information. In this case, the performance of the signing method can be implemented as executable program code in the manner of a smart contract, the signature information representing for example a pointer to the code.

Subsequently, transactions are performed in step S4 on the basis of the signed transaction data. A new data block is generated with the use of the defined cryptographic method. On account of the transaction-dependent definition of the signature information or of the cryptographic signature method, the blockchain BC can have data blocks with different digital signatures.

This is indicated in FIG. 4. Blocks Bi−1 to Bi+2 have been generated over time t. The cryptographic signature method used was changed at the point in time t*. Up until the block Bi, the cryptographic protection of the transactions has been ensured by a signature SIG1. Since for example the computing power retrievable for crypto-analyses has increased over time t, and the respective cryptographic signature method for SIG1 was deemed no longer to be secure enough, the signature method has been changed for the transactions after the time t*. The subsequent blocks Bi+1, Bi+2 contain signatures SIG2 having a stronger cryptographic security level than the signature method for SIG1. The subscribers of the blockchain BC have reached agreement by majority decision, for example, to use a longer key length than before starting from the point in time t*.

The flexible definition or determination of the signature method makes it possible to ensure that a security level adequate for the transaction is achieved. In this respect, the proposed method for operating a blockchain in which transactions are performed with the aid of digitally signed transaction data is suitable for establishing security-relevant databases. This can concern sensor and control data of an automation network for example. Use as a digital land register or for the verification of specific security properties of products is likewise conceivable. Since the cryptographic binding to the subscriber, for example a real or legal person, is flexibly adaptable, permanently secure operation can be achieved.

In particular, the abovementioned aspects with regard to blockchains, such as smart contracts, checksums, and the like, are taken into account in the proposed methods for operating distributed database systems. Although embodiments of the invention has been explained on the basis of a simple blockchain, the above-described variants of distributed ledgers can also be operated with other variants of distributed databases. Overall, the security and reliability of transactions between the subscribers are improved since a flexible adaptation of the cryptographic security level is made possible.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for operating a distributed database system having distributed node devices for providing interlinked data blocks, in particular in the manner of a blockchain, which document successive transactions between subscribers, wherein each data block corresponds to an associated transaction of the successive transactions, wherein transactions between subscribers are protected with the aid of transaction data and a cryptographic signature method, said method comprising:
for each transaction, defining the cryptographic signature method for protecting the respective transaction, wherein signature information identifying the defined cryptographic signature method is part of the transaction or part of a performance request for the transaction, wherein the interlinked data blocks have associated transactions that are adequately protected by different transaction-specific cryptographic signature methods, each different transaction-specific cryptographic signature method being characterized by a security level that adequately protects the associated transaction;
signing each transaction, said signing comprising calculating signature data according to the defined cryptographic signature method for at least some of the transaction data or the hash value thereof;
for each transaction, adding the signature data to the transaction data; and
executing the successive transactions, each executed transaction being adequately protected by the security level of the associated transaction-specific cryptographic signature method.

2. The method as claimed in claim 1, wherein the signature information has a program code for performing the defined cryptographic signature method.

3. The method as claimed in claim 1, wherein the signature information has a pointer to a program code for performing the defined cryptographic signature method.

4. The method as claimed in claim 1, comprising:
digitally signing the signature information with the aid of the defined cryptographic signature method; and
appending the digitally signed signature information to the transaction data.

5. The method as claimed in claim 1, said method further comprising:
generating a hash value for the signature information; and
digitally signing the hash value with the aid of the defined cryptographic signature method; and
appending the signed and hashed signature information to the transaction data.

6. The method as claimed in claim 1, wherein in a change transaction for all subsequent transactions a new cryptographic signature method for protecting the respective transaction is defined if a predefined proportion of subscribers agrees to the change transaction with use of the currently defined cryptographic signature method.

7. The method as claimed in claim 1, wherein a predefinable cryptographic signature method in the manner of a smart contract is provided for or in the distributed database system.

8. The method as claimed in claim 1, wherein the cryptographic signature method cryptographically interlinks a cryptographic key pair and a current key pair is assigned to each subscriber.

9. The method as claimed in claim 1, wherein the cryptographic signature method is implemented on the basis of post-quantum cryptography.

10. The method as claimed in claim 1, wherein the following steps are performed for each subscriber:
allocating a digital signature key to the subscriber, wherein the digital signature key corresponds to the currently defined cryptographic signature method;
digitally signing a transactions request of the subscriber with the aid of the digital signature key allocated to the subscriber in order to generate a digitally signed transaction request; and
confirming the transaction if the digital signature is recognized as valid, and if the transaction is consistent with a transaction history of the blockchain as distributed database system.

11. The method as claimed in claim 1, wherein the interlinked data blocks document transactions concerning a resource, and a security level of the cryptographic signature method is defined depending on a value or an amount of the resource documented in the context of the transaction.

12. The method as claimed in claim 1, wherein the interlinked data blocks document transactions concerning a resource, and the transaction is performed by way of checking entities checking the signature in the transaction data, and the checking necessitates paying an amount of the managed resource to the checking entities, which depends on the calculation complexity of the signature check.

13. A distributed database system having a plurality of node devices for providing interlinked data blocks, in particular in the manner of a blockchain, wherein each node device is configured to document transactions between subscribers in accordance with a predefined blockchain algorithm, wherein the blockchain algorithm instigates the performance of a method as claimed in claim 1 by the node devices.

14. An industrial automation network comprising a processor, a memory, a computer readable storage medium storing program instructions, and a distributed database system as claimed in claim 13 for documenting and controlling transactions for field devices, said processor configured to execute the program instructions via the memory to perform said documenting and controlling transactions for field devices.

15. The method as claimed in claim 1, wherein the security level of each cryptographic signature method is determined by a key length of a digital signature key corresponding to each cryptographic signature method, and wherein each different cryptographic signature method has a respective different key length.

* * * * *